Nov. 21, 1950 R. L. WALLACE, JR 2,530,745

TRANSISTOR MICROPHONE WITH CONDUCTIVE GRAINS

Filed Dec. 10, 1948

INVENTOR
R. L. WALLACE, JR.
BY Harry C. Hart
ATTORNEY

Patented Nov. 21, 1950 2,530,745

UNITED STATES PATENT OFFICE 2,530,745

TRANSISTOR MICROPHONE WITH CONDUCTIVE GRAINS

Robert L. Wallace, Jr., Plainfield, N. J., assignor to Bell Telephone Laboratories, Incorporated, New York, N. Y., a corporation of New York Application December 10, 1948, Serial No. 64,681

8 Claims. (Cl. 179—121)

This invention relates to novel apparatus and methods for translating mechanical vibrations into electrical variations.

The principal object of the invention is to transform mechanical vibrations such as sound waves into electrical variations in a novel manner.

A related object is to obtain amplification of the transformed mechanical variations simultaneously with the transformation.

Another object is to provide an electromechanical transducer which is extremely compact in size and light in weight.

Another object is to provide an electromechanical transducer having a high output power level and a high sensitivity.

The invention utilizes as its central element a three electrode semiconductor amplifier. This element comprises a small block of semiconductor material such as germanium having, in its original form, at least three electrodes electrically coupled thereto, which are termed the emitter electrode, the collector electrode and the base electrode. The emitter and the collector may be point contact electrodes making rectifier contact with the block, while the base electrode may be a plated metal film providing a low resistance contact. The emitter may be biased for conduction in the forward direction, while the collector is biased for conduction in the reverse direction. Application of a signal to the emitter electrode produces a signal-frequency current in the collector and in an external circuit connected thereto which may include a load. By reason of certain phenomena which take place within the block, amplified versions of the voltage, current and power of the signal appear in the load. The device may take various forms, some of which are described in the following applications for patent:

| Application | Ser. No. | Filing Date |
|---|---|---|
| J. Bardeen W. H. Brattain, abandoned in favor of | 11,165 | Feb. 26, 1948 |
| J. Bardeen-W. H. Brattain continuation in part of the above application (now Patent 2,524,035, issued October 3, 1950) | 33,466 | June 17, 1948 |
| J. Bardeen (now Patent 2,524,033, issued October 3, 1950) | 11,166 | Feb. 26, 1948 |
| J. N. Shive | 44,241 | Aug. 14, 1948 |
| W. E. Kock-R. L. Wallace, Jr | 45,023 | Aug. 19, 1948 |

The device in all of its forms has received the appelation "Transistor" and will be so designated in the present application.

Various circuit applications adapting this device to particular uses are described in the following applications for patent:

| Application | Ser. No. | Filing Date |
|---|---|---|
| H. L. Barney-R. C. Mathes (now Patent 2,517,960, issued August 8, 1950) | 22,854 | Apr. 23, 1948 |
| H. L. Barney (now Patent 2,486,776, issued November 1, 1949) | 22,276 | Apr. 21, 1948 |
| A. J. Rack (now Patent 2,476,323, issued July 19, 1949) | 27,890 | May 19, 1948 |
| R. L. Wallace, Jr | 45,024 | Aug. 19, 1948 |

The aforementioned application of R. L. Wallace, Jr., Serial No. 45,024, filed August 19, 1948, is based on the discovery that, in addition to their amplifying properties, these devices have microphonic properties as well, in that their electrical characteristics may be greatly affected by a small mechanical alteration of the contact between one of the electrodes, particularly the emitter, and the body of the semiconductor block. The mechanical alteration of the contact may comprise a change in the contact pressure or area or a change in the location of the contact as by sliding, rocking or rolling a suitably shaped electrode over the semiconductor surface, or it may comprise two or more such changes together. In either case the contact alteration may be derived from a microphone diaphragm, a phonograph needle or other vibration-responsive device, and may be imparted to the vibration-sensitive electrodes by a suitable mechanical linkage. In operation, the microphonic properties of the device result in a transformation of the input vibrations into variations in the emitter current, the emitter contact resistance, the coupling between the emitter and the collector, or into two or more of these electrical features simultaneously; while, by reason of the amplifying properties of the device, the input vibrations, as thus electrically transformed, reappear in the output circuit at a higher power level.

The present invention constitutes an improvement in the electromechanical transducer of the aforementioned Wallace application, and is based on the realization that, by the use of certain novel structures which combine functions of electrical insulation, mechanical support and the transmission of mechanical movement, the simplicity, ruggedness and efficiency which characterize the well-known carbon grain microphone may be turned to account in the construction and operation of a transistor microphone.

Broadly, the invention includes the adoption of a composite emitter electrode comprising for example, a plurality of grains of conducting material such as carbon employed as multiple emitter contacts for the transistor, or a composite collector electrode comprising a similar plurality of grains employed as multiple collector contacts, or both. It also includes novel mounting arrangements which enable the minute movements of a vibration-responsive member such as a microphone diaphragm, a phonograph needle or the like, to be translated into substantial variations of the pressure of the grains of one or the other or both sets against the semiconductor material, and so the generation in a suitably connected load circuit of a signal which is an amplified electrical version of the mechanical signal, for example, a voice wave, which actuates the diaphragm or other responsive member. In one form, a cup-shaped recess is formed in an elastic block, a septum of insulating material is placed within this recess, dividing it into two mutually insulated parts, each part is filled with grains of conducting material such as carbon, and the recess is closed with a block of semiconducting material such as germanium. The two groups of carbon grains, while insulated from one another by the septum, bear against the semiconductor material, the grains on one side of the septum constituting multiple emitter point contacts for the transistor and the grains on the other side of the septum constituting multiple collector point contacts. Suitable external connections are made for biasing the various contacts with respect to the semiconductor for transistor operation. Compression of the elastic supporting block, as by the movement of a voice-operated diaphragm, varies the pressure of at least some of the grains against the semiconductor block and so gives rise to a signal in the load circuit which is an amplified electrical version of the voice wave.

In an alternative form, the block which closes the recess is of insulating, elastic material and the septum which subdivides the recess is itself a thin, preferably tapered or wedge-shaped, block of germanium or other suitable semiconductor material of the type described and claimed in the aforementioned application of J. N. Shive, Serial No. 44,241, filed August 14, 1948. Movement of the recessed body against the elastic base causes axial movement of the wedge-shaped semiconductor body with respect to the elastic base which then yields to permit such movement. At the same time the movements of he wedge-shaped semiconductor body in one direction, and of portions of the elastic recess closure in the other direction with respect to a median plane, cause variations of the contact pressure between the wedge-shaped semiconductor body and at least some of the conducting grains. Suitable electrical contacts being made to the semiconductor body and to the conducting grains, and an external circuit including a load and an operating potential source being provided and interconnecting these electrodes, a signal is generated in the load which is an amplified electrical version of the movements of the semiconductor body with respect to the elastic base and therefore of the diaphragm, or other vibration responsive device, and so of the voice wave or other mechanical signal which gives rise to them.

Still other forms are possible.

The invention will be fully apprehended from the following detailed description of certain preferred embodiments thereof, taken in connection with the appended drawings in which.

Figure 1:
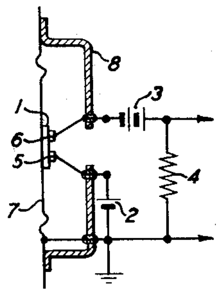
Fig. 1 is a schematic circuit diagram illustrating the invention in its broad aspects.

Referring now to the figures, and by way of a first example to Fig. 1, the central element of the transducer of the invention is a three-electrode semiconductor amplifier unit which may be of the type which forms the subject-matter of the aforementioned applications of John Bardeen and W. H. Brattain. In brief and as a preferred example, it may comprise a small block 1 of germanium, fabricated and prepared as set forth above. The block surface should be as smooth as possible, and is preferably polished, mechanically, electrolytically, or both. Processes for the electrolytic polishing of various surfaces are described in "Electrolytic Polishing of Stainless Steel and Other Metals" by Otto Zmeskal, published in "Metal Finishing" for July, 1945 at page 280. In the transistor as described in the Bardeen-Brattain applications, two metal point electrodes, denoted emitter and collector, respectively, make contact with the treated surface, preferably close together, while a third electrode, which may be a plated metal film and is denoted the base electrode, makes low resistance contact with the opposite face of the block. A small bias voltage source 2 of appropriate polarity is connected between the body of the semiconductor block and the emitter electrode, while a larger bias voltage source 3 of opposite polarity is connected from the body of the block 1 by way of a load resistance 4 to the collector electrode. The polarities of these sources are such that the emitter is biased for conduction in the forward direction, while the collector is biased for conduction in the reverse direction. The actual signs of the bias sources satisfying these conditions are dependent on the conductivity type (N type or P type) of the semiconductor material employed. In the case of the N-type germanium, for example, the forward direction bias on the emitter electrode is approximately one volt positive, while the reverse direction bias on the collector electrode is approximately 50 volts negative.

In accordance with the present invention in one of its principal forms, the single point contact electrodes of the Bardeen-Brattain application are replaced by a plurality of grains or granules of conducting material, such as carbon, as multiple emitter point contacts for the transistor and a similar plurality of grains or granules as multiple collector point contacts. These grains may be supported in operative relation with the transistor block 1 in small receptacles 5, 6, which are mounted in such a way that mechanical vibrations cause corresponding pressure variations between the block 1 and the contact points. Thus, for example, the base of the block 1 can be mounted on a microphone diaphragm 7 which may also serve as an electrical connection between the block 1 and the contact points, and which is adapted to be driven by incident sound waves. The whole structure may be mounted on a suitable support 8.

Figure 2:
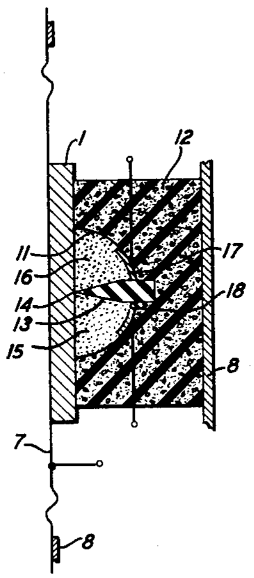
Fig. 2 is a cross-sectional view of a part of a transistor microphone suitable for use in the circuit diagram of Fig. 1.
Figure 3:
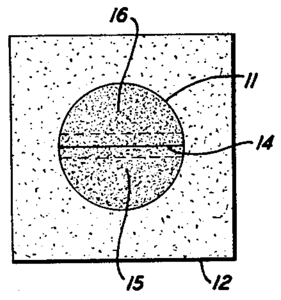
Fig. 3 is an end view of Fig. 2 in section.

Figs. 2 and 3 show one form of transistor microphone in which a cup-shaped recess 11 in a block 12 of pliable material, having low volume compressibility, such as rubber, is divided into two chambers by a septum 13 of insulating material such as mica, hard rubber or the like. This septum is formed to have a sharp knife edge 14 in the plane of the opening of the recess 11. The two chambers thus formed by the septum are filled with grains of a conducting material such as carbon and then cemented or otherwise fastened to the semiconductor block. The individual grains of the two mutually insulated groups 15, 16 serve as multiple emitters and collectors. Electrical contacts to these emitters and collectors can be made by two metal strips or discs 17, 18 cemented or otherwise held against the inner walls of the chamber 11 on the two sides of the septum 13. The assembly is mounted with the back of the semiconductor block 1 secured to a diaphragm 7 and preferably making a low resistance contact thereto. The back side of the pliable block 12 is mounted on a rigid or massive support 8.

When a force is exerted on the diaphragm 7 the semiconductor block 1 and septum 13 are caused to move in a direction tending to compress the pliable block 12. This block, having a low volume compressibility, is radially distorted thus tending to decrease the volume of the recess 11 thereby increasing the pressure of the grains in each of the two chambers 15, 16 against the semiconductor 1. When the diaphragm 7 is subjected to a varying pressure as by a sound wave, a corresponding variable pressure arises between the grains and the semiconductor. As explained in the aforementioned Wallace application, such a pressure variation between any one of the contact points and the semiconductor gives rise to an amplified electrical version of the diaphragm pressure. Because of the simultaneous pressure variations on the collector and emitter contacts, and also because of the plurality of emitter and collector contacts, the amplified electrical version of the incident diaphragm pressure is greater than in the case of a single variable-pressure emitter contact.

Figure 4:
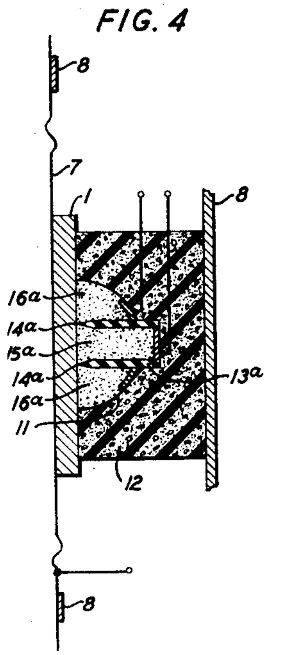
Fig. 4 is a cross-sectional view of a construction alternative to that of Fig. 2.
Figure 5:
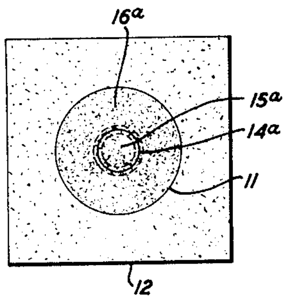
Fig. 5 is an end view of the microphone of Fig. 4 in section.

Figs. 4 and 5 show a variant in which the septum is in the form of an annulus *13a* in the cup-shaped recess 11 of a pliable block 12. In this case one group of multiple contact grains *15a* is disposed inside of the annular septum *13a* while the other group, *16a*, is disposed outside of it.

Figure 6:
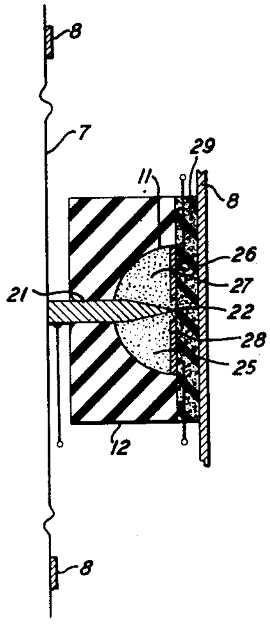
Fig. 6 is a cross-sectional view of still another modification of the transistor microphone of Fig. 2.

Still another variant, Fig. 6, makes use of a wedge-shaped block 21 of semiconductor material as a septum. This semiconductive septum is secured to the diaphragm 7 and extends through a pliable block 12 having a cup-shaped recess 11, thus dividing the recess 11 into two chambers each of which is filled with conducting grains 25, 26. The recess is closed by a disc 29 of pliable material, the back of which is restrained from motion as by mounting on a rigid or massive support 8. The two groups of grains 25, 26 contained in the two chambers thus form multiple emitter and collector contacts against the two sides of the semiconductor wedge 21. Electrical contacts to these two groups of conducting grains are made by way of metal discs 27, 28, secured to the pliable cover 29 or otherwise disposed within the two subdivisions of the recess 11. When a force is applied to the diaphragm 7 the tip 22 of the semiconductor septum 21 is capable of moving by virtue of the pliability of the block 12 and its cover 29, and its exerts pressure against the grains 25, 26 on the two sides simultaneously. When the diaphragm pressure is varied as by an incident sound wave, the output of the transistor comprises an amplified electrical version of the sound wave.

What is claimed is:

1. A semiconductive body with a surface, said surface having at least two parts, a first plurality of point contact means engaging one part of the surface of said body, a second plurality of point contact means engaging another part of the surface of the body, and vibration-responsive means for varying the contact pressure of at least some of said members with said body.

2. A microphone which comprises a vibratile diaphragm, a semiconductive body mounted on and movable with said diaphragm, said body having a surface, said surface having at least two parts, a first plurality of point contact means engaging one part of the surface of said body, a second plurality of point contact means engaging another part of the surface of the body, and an external circuit interconnecting said members with said body and including a load and a potential source for biasing the members of said first plurality in the forward direction and the members of said second plurality in the reverse direction, whereby a current flows in said load which is an amplified electrical counterpart of sound waves impinging on said diaphragm.

3. A microphone which comprises a vibratile diaphragm, a semiconductive body with a surface, mounted on and movable with said diaphragm, said surface having at least two parts, a first electrode making point contact with one part of the surface of said body, a second electrode making point contact with another part of the surface of the body, and an external circuit interconnecting said electrodes with said body and including a load and a potential source for biasing the first electrode in the forward direction and the second electrode in the reverse direction with respect to the semiconductive body, whereby a current flows in said load which is an amplified electrical counterpart of sound waves impinging on said diaphragm.

4. A semiconductive body, a first plurality of conductive grains making multiple point contact with one part of the surface of said body, a second plurality of conductive grains making multiple contact with another part of the surface of said body and otherwise insulated from the grains of said first plurality, an electrode connected to the grains of said first plurality, a second electrode connected to the grains of said second plurality, a third electrode connected to said body, an external circuit interconnecting said electrodes and including a load and a potential source for biasing the grains of the first plurality in the forward conduction direction and the grains of the second plurality in the reverse conduction direction with respect to said body, and an element responsive to vibrations arranged to vary the point contact pressure between at least some of said grains and said body, thereby generating in said load signals which are electrical versions of said vibrations.

5. A container of which at least part of one interior wall comprises a semiconductive body having transistor characteristics, a plurality of conductive grains filling said container and bearing against said body as multiple point contact electrodes, at least one other point electrode contact engaging said body, another electrode making low resistance contact with said body, an external circuit interconnecting said electrodes and including a load and a potential source for biasing the grains of the first plurality in the forward conduction direction and the other point contact electrode in the reverse conduction direction with respect to said body, and vibration-responsive means arranged to vary the contact pressure of said grains against said body.

6. A transducer which comprises a body of semiconductive material, a first plurality of parallel-connected point contact members engaging one part of said body and constituting multiple emitters, a second plurality of parallel-connected point contact members engaging another part of said body, and constituting multiple collectors, an external circuit including a load and a potential source for biasing the point contact members of the first plurality in the forward conduction direction and the point contact members of the second plurality in the reverse conduction direction with respect to said body, and vibration-responsive means for varying the contact pressure of the members of at least one of said pluralities against said body to cause a corresponding electric signal to appear in said load.

7. A vibratile member, a semiconductive body mounted on and movable with said member, an elastic insulating member bearing against said body and having a recess therein, a septum dividing said recess into two portions, elastic grains of conductive material filling each portion of said recess and bearing on the surface of said semiconductive body, a metal electrode within each of said recess portions making contact with the grains of said recess portion, a third electrode making contact with said semiconductive body, and a circuit including an operating bias source and a load interconnecting said electrodes, whereby vibrations of said vibratile member cause electric signals to be produced in said load in related conformance with said vibrations.

8. A vibratile diaphragm, a body of mechanically yielding, electrically insulating material having a recess therein, a first member bearing against said body and closing the mouth of said recess and defining, with the interior walls of said recess, a closed cavity, a second member fixed within said cavity, bearing against said first member and subdividing said cavity into two separate portions, one of said two members being an insulator and the other being a semiconductor having transistor characteristics, said other member being mounted on and movable with said diaphragm relatively to said body, a first plurality of grains of conductive material substantially filling one of said cavity portions, and bearing against one part of the inner face of the first member and against one face of the second member and constituting multiple emitter contacts with said semiconductor, a second plurality of similar grains substantially filling the other cavity portion and bearing against another part of the inner face of the first member and against the opposite face of the second member and constituting multiple collector contacts with said semiconductor, individual conductors connected to said semiconductor, said multiple emitters and said multiple collectors, respectively, an external circuit including a bias source and whereby movements of said diaphragm in response to vibrations compress said body and said cavity and so vary the pressure of at least some of said grains against said semiconductor, to generate a signal which is an electrical counterpart of said vibrations in said load.

ROBERT L. WALLACE, Jr.

REFERENCES CITED

The following references are of record in the file of this patent:

UNITED STATES PATENTS

| Number | Name | Date |
|---|---|---|
| 920,425 | Browne | May 4, 1909 |
| 1,105,066 | Comer | July 28, 1914 |
| 1,534,148 | Vogt | Apr. 21, 1925 |
| 1,745,175 | Lilienfeld | Jan. 28, 1930 |
| 2,347,098 | Green | Apr. 18, 1944 |
| 2,353,162 | Kaltenbacher | July 11, 1944 |
| 2,444,218 | Carnahan | June 29, 1948 |

OTHER REFERENCES

Electronics, pages 68–71, Sept. 1948.